(12) United States Patent
Morokawa et al.

(10) Patent No.: US 11,001,144 B2
(45) Date of Patent: May 11, 2021

(54) VEHICLE DISPLAY DEVICE

(71) Applicant: MAZDA MOTOR CORPORATION, Hiroshima (JP)

(72) Inventors: Hado Morokawa, Aki-gun (JP); Juntaro Matsuo, Aki-gun (JP); Kohji Ohta, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 16/646,925

(22) PCT Filed: Aug. 27, 2018

(86) PCT No.: PCT/JP2018/031553
§ 371 (c)(1),
(2) Date: Mar. 12, 2020

(87) PCT Pub. No.: WO2019/058881
PCT Pub. Date: Mar. 28, 2019

(65) Prior Publication Data
US 2020/0262295 A1   Aug. 20, 2020

(30) Foreign Application Priority Data

Sep. 21, 2017  (JP) .............................. JP2017-181635
Sep. 21, 2017  (JP) .............................. JP2017-181636

(51) Int. Cl.
*G09G 5/00*   (2006.01)
*B60K 35/00*  (2006.01)
(Continued)

(52) U.S. Cl.
CPC ............ *B60K 35/00* (2013.01); *G06F 3/0482* (2013.01); *G06F 3/0484* (2013.01); *G09G 5/003* (2013.01);
(Continued)

(58) Field of Classification Search
CPC .............. G06F 3/04845; G06F 3/0482; G06F 3/04842; G06F 3/0484; G06F 3/047;
(Continued)

(56) References Cited

U.S. PATENT DOCUMENTS

D625,321 S  * 10/2010 Choi ........................... D14/486
2002/0087747 A1   7/2002 Yamaguchi et al.
(Continued)

FOREIGN PATENT DOCUMENTS

EP        2884380 A1    6/2015
JP     2002-157078 A    5/2002
(Continued)

OTHER PUBLICATIONS

The extended European search report issued by the European Patent Office dated May 28, 2020, which corresponds to European Patent Application No. 18859349.5-1210 and is related to U.S. Appl. No. 16/646,925.
(Continued)

*Primary Examiner* — Jennifer T Nguyen
(74) *Attorney, Agent, or Firm* — Studebaker & Brackett PC

(57) ABSTRACT

A vehicle display device includes a display for displaying an operation screen, an operation unit prepared separately from the display, and a display control unit for controlling display of the display according to an operation of the operation unit. The operation unit is configured to be turnable. The display control unit displays, on the operation screen, an operation unit image mimicking the shape of the operation unit, and a plurality of selection items selectable by a turning operation of the operation unit in an overlapping manner.

6 Claims, 9 Drawing Sheets

(51) Int. Cl.
*G06F 3/0482* (2013.01)
*G06F 3/0484* (2013.01)

(52) U.S. Cl.
CPC ... *B60K 2370/115* (2019.05); *B60K 2370/152* (2019.05); *G09G 2340/12* (2013.01); *G09G 2380/10* (2013.01)

(58) Field of Classification Search
CPC ..... G06F 3/044; G06F 3/04817; G09G 5/003; G09G 2300/0426
USPC .................................................. 345/156, 161
See application file for complete search history.

(56) References Cited

U.S. PATENT DOCUMENTS

| | | | |
|---|---|---|---|
| 2003/0048309 A1 | 3/2003 | Tambata et al. | |
| 2003/0234764 A1* | 12/2003 | Noguchi | B60R 11/02 345/156 |
| 2004/0155905 A1 | 8/2004 | Arai | |
| 2005/0183012 A1 | 8/2005 | Petro et al. | |
| 2006/0146165 A1 | 7/2006 | Hagiwara et al. | |
| 2007/0226622 A1* | 9/2007 | Kim | H04N 21/4312 715/716 |
| 2010/0204884 A1 | 8/2010 | Tanaka | |
| 2011/0130921 A1* | 6/2011 | Ono | B60K 37/06 701/36 |
| 2014/0168122 A1* | 6/2014 | Jiang | G06F 3/0485 345/173 |
| 2014/0380243 A1 | 12/2014 | Furue et al. | |
| 2016/0004367 A1* | 1/2016 | Shimada | B60K 37/02 345/174 |

FOREIGN PATENT DOCUMENTS

| | | |
|---|---|---|
| JP | 2003-076460 A | 3/2003 |
| JP | 2005-216284 A | 8/2005 |
| JP | 2006-062399 A | 3/2006 |
| JP | 2006-191301 A | 7/2006 |
| JP | 2010-129070 A | 6/2010 |
| JP | 2015-007841 A | 1/2015 |
| JP | 2016-016697 A | 2/2016 |
| KR | 10-2006-0082954 A | 7/2006 |
| WO | 2014/132750 A1 | 9/2014 |

OTHER PUBLICATIONS

International Search Report issued in PCT/JP2018/031553; dated Nov. 20, 2018.

* cited by examiner

VEHICLE DISPLAY DEVICE

TECHNICAL FIELD

The present invention relates to a vehicle display device for controlling display of an operation screen of a display according to an operation of an operation unit prepared separately from the display.

BACKGROUND ART

As a vehicle display device to be installed in a vehicle such as an automobile, there is known a configuration including an operation unit to be operated by a driver, a display for displaying an operation screen of a vehicle-mounted device such as a navigation device and an audio device, and a display control unit for controlling display of the display according to an operation of the operation unit. The display is disposed, for example, at a predetermined position of a front portion of a passenger compartment where the driver can visually recognize, and the operation unit is disposed, for example, on a console portion next to the driver's seat.

Concerning the vehicle display device, it is difficult for the driver to move the line of sight to the operation unit during driving the vehicle. In view of the above, there is known a configuration in which an operation guide for guiding an operation of the operation unit is displayed on the operation screen of the display to make it easy for the driver to operate the operation unit.

For example, Patent Literature 1 discloses a vehicle display device including a display, and a commander unit as an operation unit, wherein when touch of the commander unit by an operator is detected, an operation guide of the commander unit is displayed on an operation screen.

Specifically, in the vehicle display device described in Patent Literature 1, as the operation guide, an operation unit image mimicking the shape of the commander unit, and a plurality of selection items being a selection target by an operation of the commander unit are respectively displayed at different positions on the operation screen of the display.

However, it is often the case that a display for use in a vehicle has a relatively small and limited area. Therefore, when the operation unit image and the selection items are displayed at different positions on the operation screen of the display as described above, the operation unit image and the selection items are displayed small, and the driver may find it difficult to recognize the operation guide.

CITATION LIST

Patent Literature

Patent Literature 1: Japanese Unexamined Patent Application Publication No. 2010-129070

SUMMARY OF INVENTION

In view of the above, an object of the present invention is to provide a vehicle display device that enables to intuitively guide an operation of an operation unit with use of an operation screen of a display in a user-friendly manner.

In order to solve the above issue, the present invention is directed to a vehicle display device including a display for displaying an operation screen, an operation unit prepared separately from the display, and a display control unit for controlling display of the display according to an operation of the operation unit. The operation unit is configured to be turnable. The display control unit displays, on the operation screen, an operation unit image mimicking a shape of the operation unit, and a plurality of selection items selectable by a turning operation of the operation unit in an overlapping manner.

DESCRIPTION OF EMBODIMENTS

In the following, an embodiment according to the present invention is described with reference to the accompanying drawings.

Figure 1:
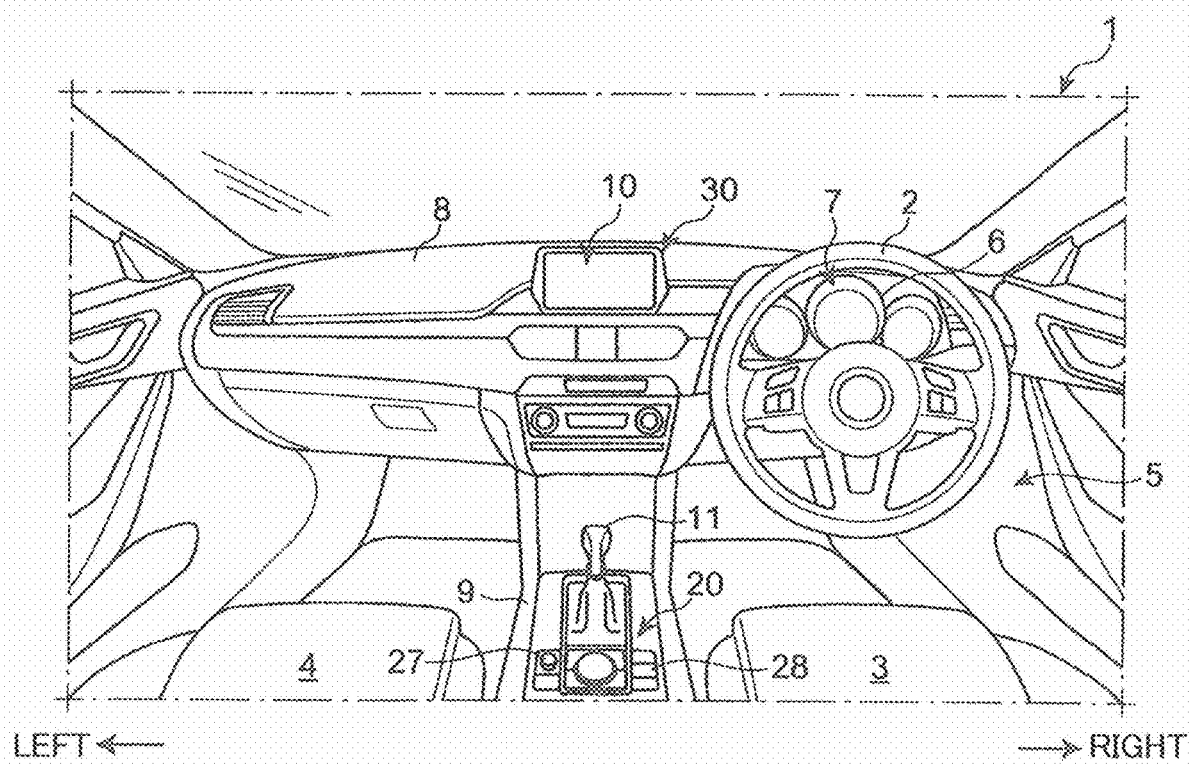
FIG. 1 is a diagram illustrating a passenger compartment of a vehicle in which a vehicle display device according to an embodiment of the present invention is installed.

FIG. 1 is a diagram illustrating a passenger compartment 5 of a vehicle 1 in which a vehicle display device 30 according to an embodiment of the present invention is installed. As illustrated in FIG. 1, the vehicle 1 is a right-hand drive car in which a steering wheel 2 and a driver's seat 3 are disposed on the right side of the passenger compartment 5, and a passenger's seat 4 is disposed on the left side of the passenger compartment 5. A dashboard 8 incorporated with an instrument panel 7 including a meter display unit 6 is disposed on a front portion of the passenger compartment 5, which is located on the front side of the driver's seat 3 and the passenger's seat 4.

The dashboard 8 is provided in such a way as to extend in a vehicle width direction. A display 10 is disposed on an upper surface of a middle portion of the dashboard 8 in the vehicle width direction. The display 10 is configured to display an operation screen of a vehicle-mounted device such as a navigation device and an audio device, and a display screen indicating various types of information and the like. The display 10 is disposed at such a position that a driver seated on the driver's seat 3 can visually recognize. The display 10 is, for example, constituted of a liquid crystal display or the like.

A center console portion 9 is connected to a lower surface of the middle portion of the dashboard 8 in the vehicle width direction. The center console portion 9 includes a first portion passing between the driver's seat 3 and the passenger's seat 4 and extending in a front-rear direction, and a second portion extending upwardly from a front end of the first portion and connected to the middle portion of the dashboard 8 in the vehicle width direction. A shift lever 11 for operating a transmission (not illustrated), and an operation unit 20 for operating an operation screen of the display 10 are disposed in the center console portion 9.

Figure 2:
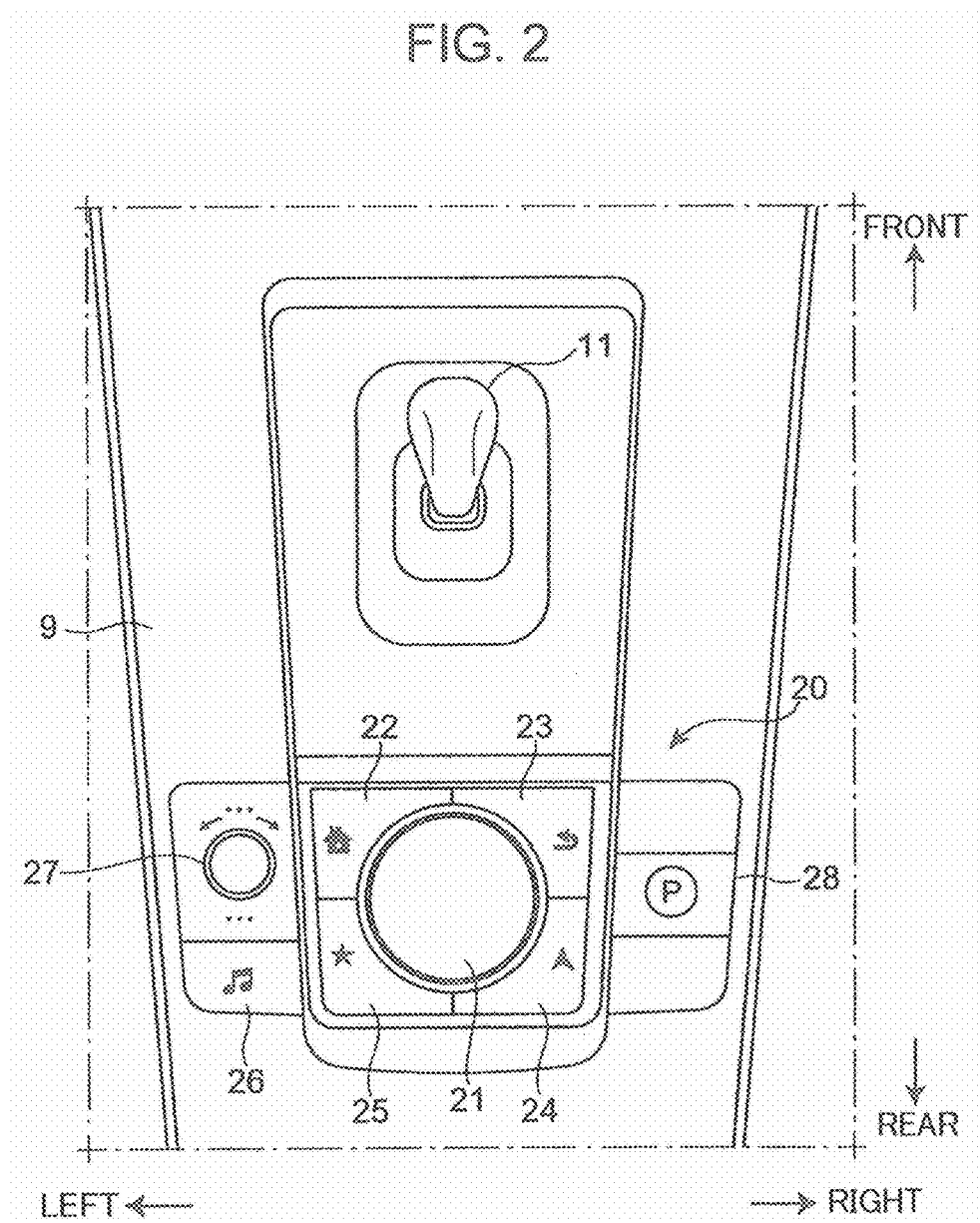
FIG. 2 is a diagram illustrating a configuration of an operation unit.

FIG. 2 is a diagram illustrating a configuration of the operation unit 20. As illustrated in FIG. 2, the operation unit 20 includes a commander unit 21 having a circular outer shape and constituted of a cylindrical switch having a predetermined height. The commander unit 21 is configured to be turnable clockwise and counterclockwise, tiltable forward, rearward, rightward, and leftward, and depressable downwardly. A turning operation and a tilting operation of the commander unit 21 are performed to select a selection item on an operation screen of the display 10, and a depressing operation of the commander unit 21 is performed to determine the selected selection item.

The operation unit 20 further includes four push buttons 22, 23, 24, and 25 around the commander unit 21. Specifically, the first push button 22 is disposed on the front left side of the commander unit 21, the second push button 23 is disposed on the front right side of the commander unit 21, the third push button 24 is disposed on the rear right side of the commander unit 21, and the fourth push button 25 is disposed on the rear left side of the commander unit 21. The four push buttons 22, 23, 24, and 25 are depressable button switches.

The operation unit 20 further includes a fifth push button 26 on the left side of the fourth push button 25. The fifth push button 26 is a depressable button switch.

A volume control switch 27 is disposed on the front side of the fifth push button 26 on the center console portion 9. The volume control switch 27 is a cylindrical switch, which is turnable clockwise and counterclockwise. By turning the volume control switch 27, the volume of a speaker (not illustrated) installed in the vehicle 1 is adjusted.

A parking switch 28 is disposed on the right side of the second push button 23 and the third push button 24. The parking switch 28 is a lever switch, which is operable to pull up and push down. When the parking switch 28 is pulled up, an electrically operated parking brake (not illustrated) installed in the vehicle is actuated, and when the parking switch 28 is pushed down, the parking brake is released.

Figure 3:
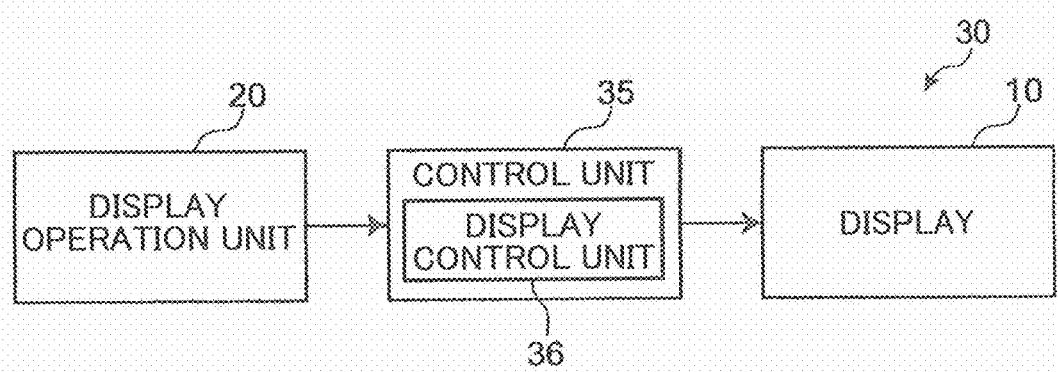
FIG. 3 is a block diagram illustrating a configuration of the vehicle display device.

FIG. 3 is a block diagram illustrating a configuration of the vehicle display device 30. As illustrated in FIG. 3, the vehicle display device 30 includes the display 10, the operation unit 20 prepared separately from the display 10, and a control unit 35 for controlling display of the display 10 according to an operation of the operation unit 20. The control unit 35 is configured by including a known microcomputer as a main portion.

As described above, the display 10 displays an operation screen of a vehicle-mounted device, and a display screen indicating various types of information and the like. As described above, the operation unit 20 is constituted of various types of switches, which are turnable, tiltable, and depressable. The operation unit 20 includes the commander unit 21, which is turnable, tiltable, and depressable, and the depressable first, second, third, fourth, and fifth push buttons 22, 23, 24, 25, and 26.

The control unit 35 includes a display control unit 36 for controlling display of the display 10. The display control unit 36 controls a content to be displayed on an operation screen and a display screen of the display 10 according to an operation of the operation unit 20. For example, when a predetermined operation signal is input from the operation unit 20, the display control unit 36 controls the display 10 in such a way that predetermined information (an operation guide) for guiding an operation of the operation unit 20 is displayed on an operation screen of the display 10.

The control unit 35 further includes an operation control unit (not illustrated). The operation control unit controls an operation of a vehicle-mounted device according to an operation of the operation unit 20.

Figure 4:
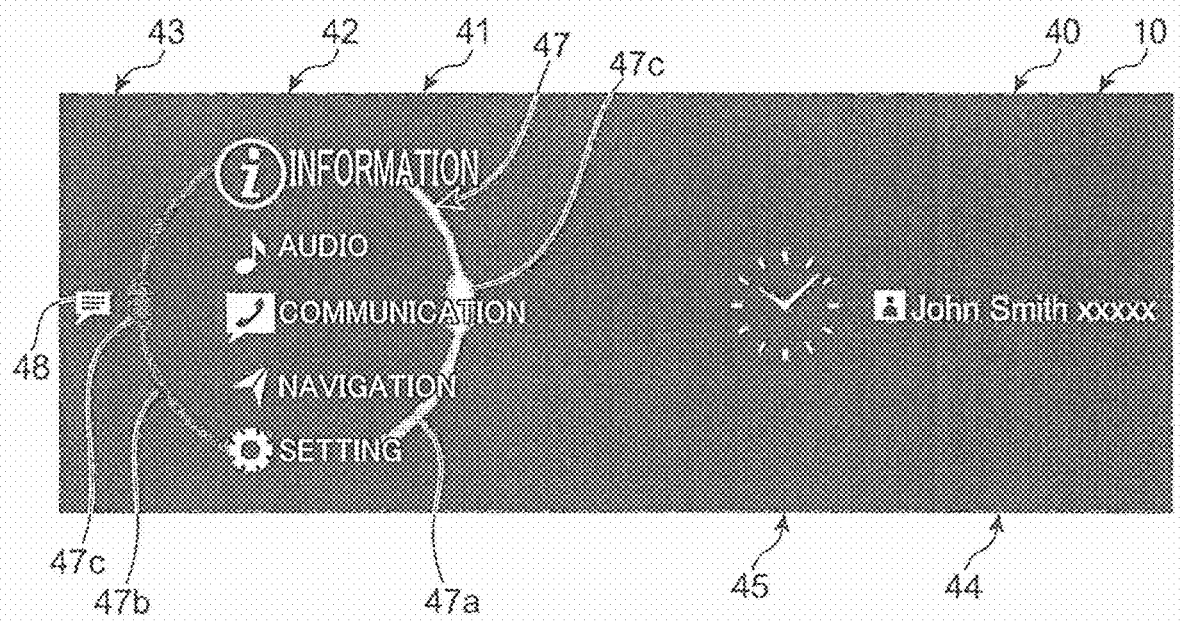
FIG. 4 is a diagram illustrating a home screen of a display.

FIG. 4 is a diagram illustrating a home screen 40 of the display 10. As illustrated in FIG. 4, first, the home screen 40 being an operation screen of an uppermost layer is displayed on the display 10. The home screen 40 includes an operation unit image display portion 41, a turn selection item display portion 42, a tilt selection item display portion 43, a tilt selection content display portion 44, and a clock display portion 45.

An operation unit image 47 mimicking the shape of at least a part of the operation unit 20 is displayed in the operation unit image display portion 41. In the present embodiment, an arc-shaped image mimicking the shape of the commander unit 21 is displayed as the operation unit image 47. The arc-shaped operation unit image 47 includes a rightward projecting semi-arcuate portion 47a and a leftward projecting semi-arcuate portion 47b.

The operation unit image 47 is displayed in such a way as to turn in association with a turning operation of the commander unit 21. Specifically, the operation unit image 47 includes a pair of broad portions 47c formed by partially widening the semi-arcuate portions 47a and 47b. The broad portions 47c are displayed in such a way as to move in a circumferential direction along the semi-arcuate portions 47a and 47b, as the commander unit 21 is turned. Thus, the driver is allowed to recognize as if the operation unit image 47 turns in association with a turning operation of the commander unit 21.

A plurality of selection items selectable by a turning operation of the commander unit 21 is displayed in the turn selection item display portion 42. In the present embodiment, as selection items, each of the items "information", "audio", "communication", "navigation", and "setting" is displayed as combination of characters and an icon.

The plurality of selection items are displayed in alignment in an up-down direction in the turn selection item display portion 42. First, as the home screen 40, a screen indicating that a selection item disposed on an uppermost portion is selected is displayed. More specifically, in the default home screen, "information" being a selection item disposed on the uppermost portion is displayed large, as compared with the other selection items. In other words, on each operation screen of the display 10, a selected operation item is displayed with a relatively large size (enlargedly displayed) in order to discriminate a selection item selected by an operation of the commander unit 21 from the other (non-selected) selection items.

In the present embodiment, regarding turning directions of the commander unit 21, it is assumed that a clockwise direction is a forward direction, and a counterclockwise direction is a reverse direction. The driver is allowed to select a selection item other than the selection item ("information") on the uppermost portion by turning the commander portion 21 clockwise (in a forward direction) in a state that the default home screen 40 (FIG. 4) is displayed. Specifically, a selection target (a target for enlarged display) successively shifts from an upper item to a lower selection item among the plurality of selection items, as the commander unit 21 is turned clockwise.

On the home screen 40, the turn selection item display portion 42 is set on the left side on the screen similarly to the operation unit image display portion 41. Thus, in the turn selection item display portion 42, the plurality of selection items selectable by a turning operation of the commander unit 21 are displayed in alignment in an up-down direction, while overlapping the operation unit image 47.

The operation unit image 47 is displayed in such a way that a luminance of the right-side semi arcuate portion 47a is higher than a luminance of the left-side semi arcuate portion 47b in association with that a forward direction of the commander unit 21 is a clockwise direction.

Figure 5:
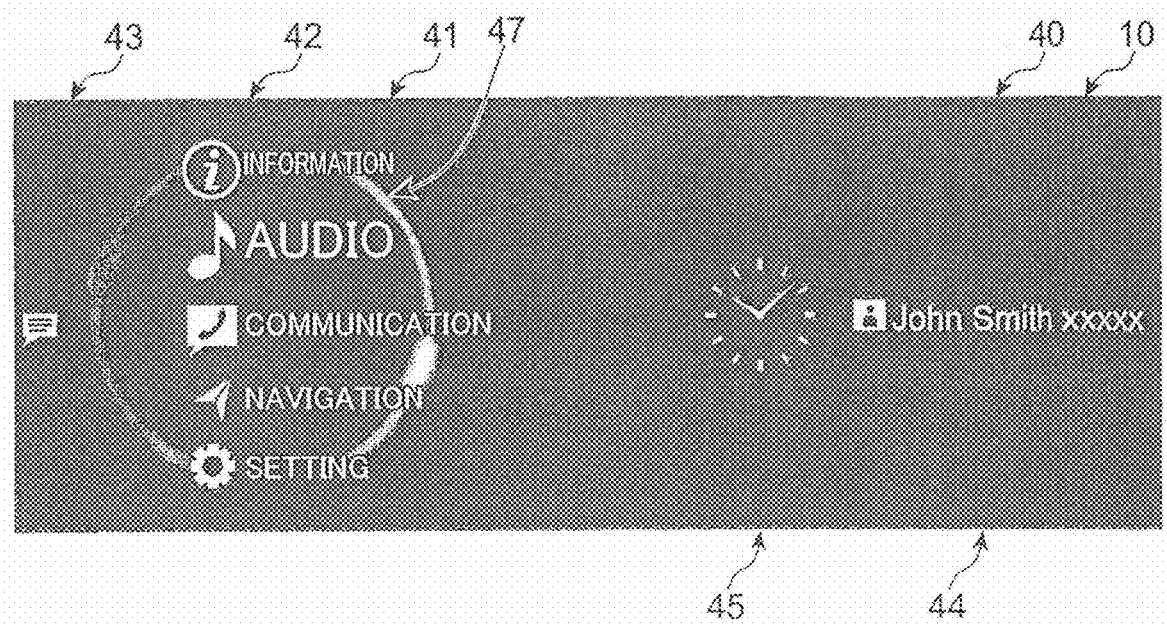
FIG. 5 is a diagram illustrating the home screen, when a commander unit is turned.

FIG. 5 is a diagram illustrating the home screen 40, when the commander unit 21 is turned. When the driver turns the commander unit 21 clockwise by a predetermined amount in a state that the default home screen 40 (FIG. 4) is displayed, as illustrated in FIG. 5, the home screen 40 switches to a state in which the item "audio" in the second row from the uppermost row is selected. Specifically, a selection target shifts from the item "information" to the item "audio" (the item "audio" is displayed large, as compared with the other items) in association with a turning operation of the commander unit 21 in a clockwise direction, and the operation unit image 47 is displayed in such a way as to turn clockwise (in such a way that the broad portion 47c moves clockwise).

Similarly to the above, it is possible to select the other selection items on the home screen 40 by turning the commander unit 21 clockwise. Specifically, by turning the commander unit 21 further clockwise from the state illustrated in FIG. 5, the selection target successively shifts to "communication", "navigation", and "setting", and the operation unit image 47 is displayed in such a way as to turn clockwise in association with the shifting operation.

When the commander unit 21 is turned counterclockwise (in a reverse direction), after having been turned clockwise (in a forward direction), the selection target successively shifts to an upper item according to a turning operation of the commander unit 21 in a counterclockwise direction, and the operation unit image 47 is displayed in such a way as to turn counterclockwise.

The tilt selection item display portion 43 is formed on the outer side of the operation unit image 47 (the operation unit image display portion 41) on the home screen 40. In the tilt selection item display portion 43, a selection item selectable by a tilting operation of the commander unit 21 is displayed at a position associated with a direction of a tiling operation of the commander unit 21 within an outer area of the operation unit image 47 (a position offset in a direction of a tilting operation with respect to the operation unit image 47). In the present embodiment, as a selection item selectable by a leftward tilting operation of the commander unit 21, for example, a selection item constituted of an icon 48 is displayed on the left side of the operation unit image 47.

In the present embodiment, an electronic mail transmission/reception device (not illustrated) being one of the vehicle-mounted devices is connected to the control unit 35. The present embodiment enables to display a message of a mail received by the electronic mail transmission/reception device on the display 10. Specifically, as illustrated in FIG. 4, when the electronic mail transmission/reception device receives a mail, the icon 48 indicating that the mail has been received is displayed on the left side of the operation unit image 47 (i.e., in the tilt selection item display portion 43), as a selection item selectable by a tilting operation of the commander unit 21. Further, when the icon 48 is selected/determined by an operation of the commander unit 21, a message screen of the received mail is displayed.

The tilt selection content display portion 44 is formed on the right side on the home screen 40 (a position away from the operation unit image 47 toward the right). When a selection item is displayed in the tilt selection item display portion 43, information relating to a content of the selection item is displayed in the tilt selection content display portion 44. For example, when the icon 48 (an icon indicating that an electronic mail has been received) is displayed as a selection item in the tilt selection item display portion 43, in the tilt selection content display portion 44, data relating to a transmitter of a message of the received mail are displayed, as information relating to a content of the icon 48.

The clock display portion 45 is formed between the operation unit image display portion 41 and the tilt selection content display portion 44. An image indicating a clock for displaying a current time is displayed in the clock display portion 45, for example.

On the home screen 40 having a configuration as described above, when one of the selection items is selected by a turning operation of the commander unit 21, and the selected item is determined by a depressing operation of the commander unit 21, an operation screen associated with the selected item is displayed on the display 10 in a hierarchical manner Specifically, when the item "information" is selected/determined on the home screen 40, an information screen being an operation screen associated with "information" is displayed in a hierarchical manner. When the item "audio" is selected/determined, an audio screen being an operation screen associated with "audio" is displayed in a hierarchical manner. When the item "communication" is selected/determined, a communication screen being an operation screen associated with "communication" is displayed in a hierarchical manner. When the item "navigation" is selected/determined, a navigation screen being an operation screen associated with "navigation" is displayed in a hierarchical manner. When the item "setting" is selected/determined, a setting screen being an operation screen associated with "setting" is displayed in a hierarchical manner.

Figure 6:
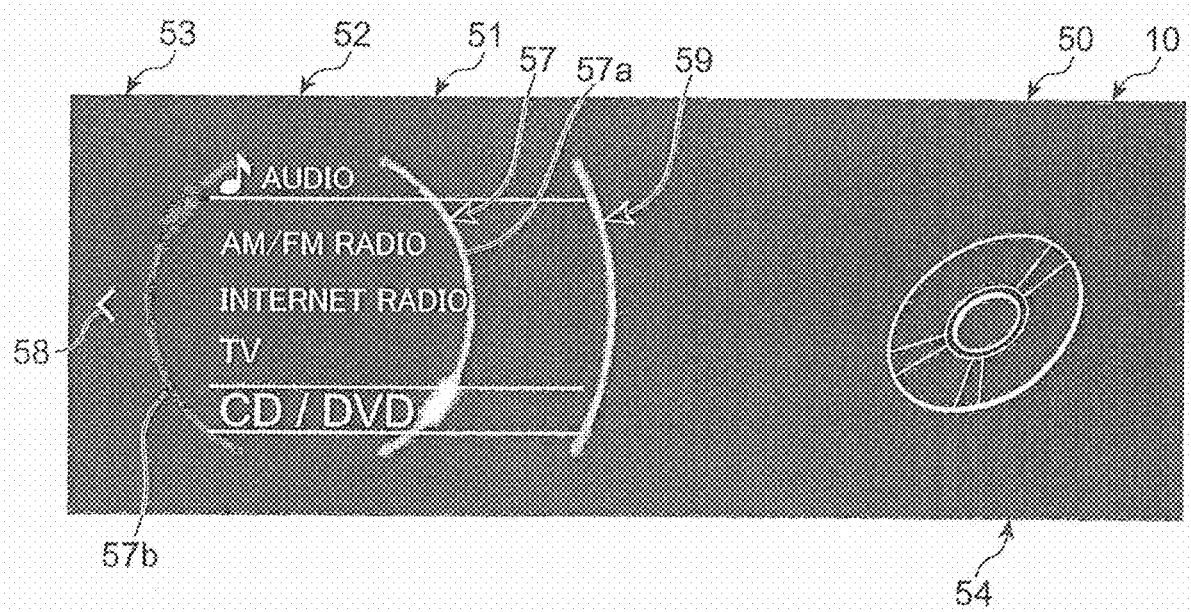
FIG. 6 is a diagram illustrating an audio screen of the display.

FIG. 6 is a diagram illustrating a state that an audio screen is displayed on the display 10. When the item "audio" is selected/determined on the home screen 40, first, as illustrated in FIG. 6, an audio screen 50 of an upper layer is displayed on the display 10. The audio screen 50 includes an operation unit image display portion 51, a turn selection item display portion 52, a tilt selection item display portion 53, and a turn selection image display portion 54.

A plurality of selection items selectable by a turning operation of the commander unit 21 are displayed in the turn selection item display portion 52. In the present embodiment, as the selection items, items "AM/FM radio", "Internet radio", "TV", and "CD/DVD" are respectively displayed as characters.

The plurality of selection items are displayed in alignment in an up-down direction in the turn selection item display portion 52. As the audio screen 50 of an upper layer, first, a screen indicating that a selection item disposed on the uppermost portion is selected is displayed. Specifically, in the default audio screen 50, "AM/FM radio" being a selection item disposed on the uppermost portion is displayed large, as compared with the other selection items, and a line is displayed above and below the characters "AM/FM radio".

The driver is allowed to select a selection item other than the selection item ("AM/FM radio") on the uppermost portion by turning the commander unit 21 clockwise (in a forward direction) in a state that the default audio screen 50 is displayed. Specifically, according to a turning operation of the commander unit 21 in a clockwise direction, a selection target (a target for enlarged display and addition of lines above and below the target) successively shifts from an upper item to a lower item among the plurality of selection items. FIG. 6 illustrates a state that the item "CD/DVD" is selected.

When the commander unit 21 is turned counterclockwise (in a reverse direction), after having been turned clockwise (in a forward direction), the selection target successively shifts to an upper item according to a turning operation of the commander unit 21 in a counterclockwise direction.

A first operation unit image 57 and a second operation unit image 59 each mimicking the shape of at least a part (the commander unit 21) of the operation unit 20 are displayed in the operation unit image display portion 51.

Similarly to the operation unit image 47 (FIG. 4) displayed in the operation unit image display portion 41, an arc-shaped image mimicking the shape of the commander unit 21 is displayed as the first operation unit image 57. The arc-shaped first operation unit image 57 includes a rightward projecting semi-arcuate portion 57a and a leftward projecting semi-arcuate portion 57b, and is displayed at a same position as the operation unit image 47.

Similarly to the operation unit image 47 (FIG. 4), the first operation unit image 57 is displayed in such a way as to turn in association with a turning operation of the commander unit 21. Further, the first operation unit image 47 is displayed in such a way that a luminance of the right-side semi arcuate portion 57a is higher than a luminance of the left-side semi arcuate portion 57b in association with that a forward direction of the commander unit 21 is a clockwise direction.

The second operation unit image 59 is displayed on the outer side of the first operation unit image 57, specifically, at a position further on the right side of the right-side semi-arcuate portion 57a of the first operation unit image 57. A rightward projecting arcuate image mimicking the shape of a right part of the commander unit 21 is displayed as the second operation unit image 59. The second operation unit image 59 is formed to have an arc shape concentric with the first operation unit image 57 (the right-side semi-arcuate portion 57a and the left-side semi-arcuate portion 57b).

On the audio screen 50, the turn selection item display portion 52 is set on the left side on the screen similarly to the operation unit image display portion 51. Thus, in the turn selection item display portion 52, the plurality of selection items selectable by a turning operation of the commander unit 21 are displayed in alignment in an up-down direction in such a way as to overlap the first operation unit image 57.

The tilt selection item display portion 53 is formed on the outer side of the first operation unit image 57 (the operation unit image display portion 51) on the audio screen 50. A selection item selectable by a tilting operation of the commander unit 21 is displayed in the tilt selection item display portion 53 at a position associated with a direction of a tilting operation of the commander unit 21 within an outer area of the first operation unit image 57 (a position offset in a direction of a tilting operation with respect to the first operation unit image 57). In the present embodiment, an icon 58 indicating that a screen returns to a preceding screen is displayed on the left side of the first operation unit image 57, as a selection item selectable by a leftward tilting operation of the commander unit 21.

The turn selection image display portion 54 is formed on the right side on the audio screen 50 (a position away from the second operation unit image 59 toward the right). An image associated with a currently selected selection item among a plurality of selection items to be displayed in the turn selection item display portion 52 is displayed in the turn selection image display portion 54. As illustrated in FIG. 6, when the item "CD/DVD" is selected, an image of a disc is displayed as an image that evokes the selected "CD/DVD" in the turn selection image display portion 54. Similarly, when the other selection item is selected, an image associated with the selected item is displayed.

On the audio screen 50 of an upper layer having a configuration as described above, when one of the selection items is selected by a turning operation of the commander unit 21, and the selected item is determined by a depressing operation of the commander unit 21, an audio screen of a lower layer associated with the selected item is displayed on the display 10. Specifically, when the item "AM/FM radio" is selected/determined on the audio screen 50 of an upper layer, an AM/FM radio screen being an audio screen of a lower layer associated with "AM/FM radio" is displayed. When the item "Internet radio" is selected/determined, an Internet radio screen being an audio screen of a lower layer associated with "Internet radio" is displayed. When the item "TV" is selected/determined, a TV screen being an audio screen of a lower layer associated with "TV" is displayed. When the item "CD/DVD" is selected/determined, a CD/DVD screen being an audio screen of a lower layer associated with "CD/DVD" is displayed.

Figure 7:
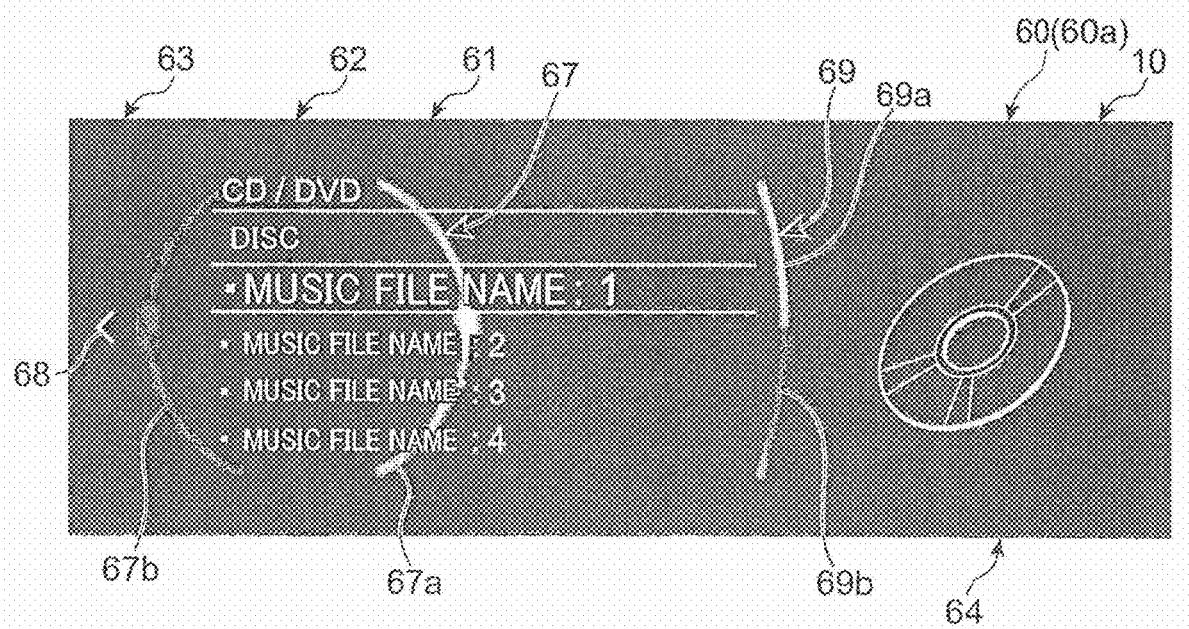
FIG. 7 is a diagram illustrating a first page of a CD/DVD screen of the display.
Figure 8:
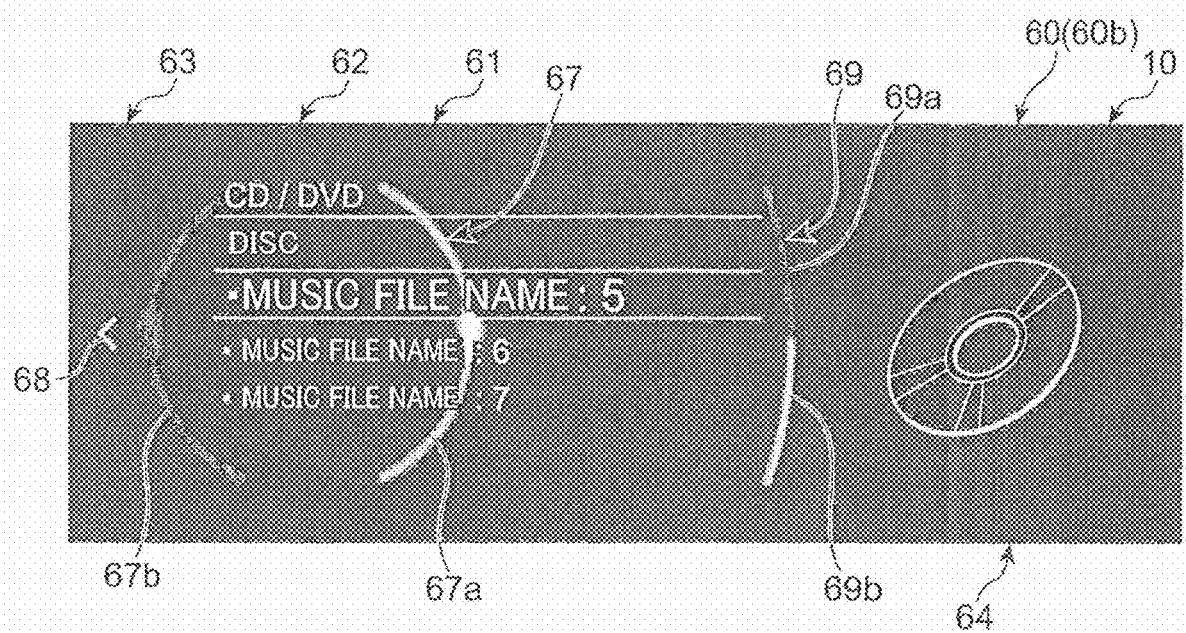
FIG. 8 is a diagram illustrating a second page of the CD/DVD screen of the display.

FIGS. 7 and 8 illustrate, as a CD/DVD screen 60, one example of an audio screen of a lower layer to be displayed on the display 10, when the item "CD/DVD" is selected/determined on the audio screen 50 of an upper layer. The CD/DVD screen 60 includes an operation unit image display portion 61, a turn selection item display portion 62, a tilt selection item display portion 63, and an operation screen image display portion 64.

A plurality of selection items selectable by a turning operation of the commander unit 21 is displayed in the turn selection item display portion 62. In the present embodiment, items "music file name: 1" to "music file name: 7" are respectively displayed in characters as selection items.

The plurality of selection items are displayed in alignment in an up-down direction in the turn selection item display portion 62. Further, the plurality of selection items are separately displayed on a plurality of pages. In the present embodiment, the plurality of selection items, namely, seven items constituted of "music file name: 1" to "music file name: 7" are separately displayed on two pages, namely, a first page 60a (FIG. 7) and a second page 60b (FIG. 8). As illustrated in FIG. 7, in the first page 60a of the CD/DVD screen 60, four items "music file name: 1" to "music file name: 4" are displayed in the turn selection item display portion 62. As illustrated in FIG. 8, in the second page 60b of the CD/DVD screen 60, three items "music file name: 5" to "music file name: 7" are displayed in the turn selection item display portion 62.

When the item "CD/DVD" is selected/determined by an operation of the commander unit 21, first, a screen of the first page 60a illustrated in FIG. 7 is displayed as the CD/DVD screen 60 in a state that the selection item on the uppermost portion is selected. Specifically, "music file name: 1" being a selection item disposed on the uppermost portion is displayed large, as compared with the other selection items, and a line is displayed above and below the characters "music file name: 1" on the default CD/DVD screen 60 (first page 60a).

By allowing the driver to turn the commander unit 21 clockwise (in a forward direction) in a state that the default CD/DVD screen 60 is displayed, the driver is allowed to select the selection items other than the selection item on the uppermost portion ("music file name: 1"). Specifically, a selection item (a target for enlarged display and addition of lines above and below the target) successively shifts from an upper item to a lower item among the plurality of selection items according to a turning operation of the commander unit 21 in a clockwise direction.

The selecting operation by the commander unit 21 can be performed over a plurality of pages (the first page 60*a* and the second page 60*b*) of the CD/DVD screen 60. For example, when the commander unit 21 is turned clockwise from a state that "music file name: 4" being a selection item on the lowermost portion is selected in the first page 60*a* illustrated in FIG. 7, the second page 60*b* illustrated in FIG. 8 is displayed, and "music file name: 5" being a selection item on the uppermost portion on the second page 60*b* is selected. Similarly, it is also possible to select, on the second page 60*b*, a selection item other than the selection item on the uppermost portion ("music file name: 5") according to a turning operation of the commander unit 21 in a clockwise direction.

When the commander unit 21 is turned counterclockwise (in a reverse direction) after having been turned clockwise (in a forward direction), the selection item successively shifts to an upper item according to a turning operation of the commander unit 21 in a counterclockwise direction.

A first operation unit image 67 and a second operation unit image 69 each mimicking the shape of at least a part (the commander unit 21) of the operation unit 20 are displayed in the operation unit image display portion 61.

As the first operation unit image 67, an arc-shaped image mimicking the shape of the commander unit 21 is displayed similarly to the first operation unit image 57 (FIG. 6) to be displayed in the operation unit image display portion 51. The arc-shaped first operation unit image 67 includes a rightward projecting semi-arcuate portion 67*a* and a leftward projecting semi-arcuate portion 67*b*. The arc-shaped first operation unit image 67 is displayed at a same position as the first operation unit image 57.

The first operation unit image 67 is displayed in such a way as to turn in association with a turning operation of the commander unit 21 similarly to the first operation unit image 57 (FIG. 6). Further, the first operation unit image 67 is displayed in such a way that a luminance of the right-side semi-arcuate portion 67*a* is higher than a luminance of the left-side semi-arcuate portion 67*b* in association with that a forward direction of the commander unit 21 is a clockwise direction.

The second operation unit image 69 is displayed on the outer side of the first operation unit image 67, specifically, at a position further on the right side of the right-side semi-arcuate portion 67*a* of the first operation unit image 67. A rightward projecting arc-shaped image mimicking the shape of a right part of the commander unit 21 is displayed as the second operation unit image 69. The second operation unit image 69 is formed to have an arc shape concentric with the first operation unit image 67 (the right-side semi-arcuate portion 67*a* and the left-side semi-arcuate portion 67*b*).

As illustrated in FIGS. 6 to 8, on an audio screen, a second operation unit image is displayed at a position farther from a first operation unit image, as a layer becomes deeper. Specifically, the second operation unit image 69 on the CD/DVD screen 60 being an audio screen of a lower layer is displayed at a position farther from the first operation unit image as compared to the second operation unit image 59 on the audio screen 50 of an upper layer. In other words, a distance from the first operation unit image 67 (specifically, the right-side semi-arcuate portion 67*a*) to the second operation unit image 69 on the CD/VD screen 60 is set longer than a distance from the first operation unit image 57 (specifically, the right-side semi-arcuate portion 57*a*) to the second operation unit image 59 on the audio screen 50.

As described above, a plurality of selection items selectable by a turning operation of the commander unit 21 are separately displayed on a plurality of pages on the CD/DVD screen 60. On the CD/DVD screen 60 as described above, the second operation unit image 69 is divided into a plurality of sections 69*a* and 69*b* associated with the plurality of pages, and a section associated with a displayed page is displayed to be distinguished from the other section.

Since the second operation unit image 69 has an arc shape, the second operation unit image 69 is divided into a plurality of sections adjacent to one another in a circumferential direction. The plurality of sections are respectively associated with, in an order from an upstream side in a forward direction of the commander unit 21 (in other words, in a clockwise direction), a first page, a second page, . . . of the plurality of pages.

In the present embodiment, a plurality of selection items are displayed over the first page 60*a* and the second page 60*b* on the CD/DVD screen 60 illustrated in FIGS. 7 and 8. Therefore, the second operation unit image 69 is divided into the first section 69*a* associated with the first page 60*a*, and the second section 69*b* associated with the second page 60*b*. The first section 69*a* associated with the first page 60*a* is disposed on the upstream side in a forward direction of the commander unit 21 (in other words, on the upper side) with respect to the second section 69*b* associated with the second page 60*b*.

As illustrated in FIG. 7, when the first page 60*a* is displayed on the display 10, the second operation unit image 69 is displayed in such a way that a luminance of the first section 69*a* is higher than a luminance of the second section 69*b*. This allows the driver to recognize the first section 69*a* associated with the selected first page 60*a* to be distinguished from the other section (the second section 69*b*). Further, as illustrated in FIG. 8, when the second page 60*b* is displayed on the display 10, the second operation unit image 69 is displayed in such a way that a luminance of the second section 69*b* is higher than a luminance of the first section 69*a*. This allows the driver to recognize the second section 69*b* associated with the selected second page 60*b* to be distinguished from the other section (the first section 69*a*).

The turn selection item display portion 62 is set on the left side on the CD/DVD screen 60 similarly to the operation unit image display portion 61. Thus, in the turn selection item display portion 62, the plurality of selection items selectable by a turning operation of the commander unit 21 are displayed in alignment in an up-down direction, while overlapping the first operation unit image 67.

The tilt selection item display portion 63 is formed on the outer side of the first operation unit image 67 (the operation unit image display portion 61) similarly to the tilt selection item display portion 53 (FIG. 6) to be displayed on the audio screen 50 of an upper layer. In the tilt selection item display portion 63, a selection item selectable by a tilting operation of the commander unit 21 is displayed at a position associated with a direction of a tiling operation of the commander unit 21 within an outer area of the first operation unit image 67 (a position offset in a direction of a tilting operation with respect to the first operation unit image 67). In the present embodiment, as a selection item selectable by a leftward tilting operation of the commander unit 21, an icon 68 indicating that a screen returns to a preceding screen is displayed on the left side of the first operation unit image 67.

The operation screen image display portion 64 is formed on the right side on the CD/DVD screen 60 (on the right side of the second operation unit image 67). An image of a disc that evokes a CD/DVD is displayed in the operation screen image display portion 64 similarly to a case of the turn selection image display portion 54 (FIG. 6).

On the CD/DVD screen 60 having a configuration as described above, when one of the selection items (in other words, either of "music file name: 1" to "music file name: 7") is selected by a turning operation of the commander unit 21, and the selected item (the music file name) is determined by a depressing operation of the commander unit 21, information associated with the selected music file name is displayed on the display 10, and music associated with the selected music file name is output from a speaker.

On the other hand, on the CD/DVD screen 60, when the icon 68 is selected by a leftward tilting operation of the commander unit 21, and the icon 68 is determined by a depressing operation of the commander unit 21, the audio screen 50 (FIG. 6) of an upper layer is displayed on the display 10 as a preceding screen.

Further, on the audio screen 50 (FIG. 6) of an upper layer, when the icon 58 is selected by a leftward tilting operation of the commander unit 21, and the icon 58 is determined by a depressing operation of the commander unit 21, the home screen 40 (FIG. 4) is displayed on the display 10 as a preceding screen.

Description has been made regarding an audio screen (the audio screen 50 of an upper layer and the CD/DVD screen 60) to be displayed in a hierarchical manner, when the item "audio" is selected/determined on the home screen 40 (FIG. 5) with reference to FIGS. 6 to 8. A configuration as to how an operation screen is displayed, when an item other than "audio" is selected/determined, is basically the same. Specifically, also when an item other than "audio" is selected/determined, and either of an information screen, a communication screen, a navigation screen, and a setting screen is displayed on the display 10, each type of information is divided into a plurality of layers and displayed, similarly to a case that an audio screen is displayed.

For example, a communication screen includes a screen of an upper layer on which "telephone" and "message" are displayed as selection items, and a screen of a lower layer to be displayed, when either of the items "telephone" and "message" is selected/determined by an operation of the commander unit 21. Specifically, a message screen for presenting a content of a message is displayed on the display 10, as a screen of a lower layer when the item "message" is selected/determined.

It is also possible to perform an operation similar to the above on the home screen 40 (FIG. 4). Specifically, on the home screen 40, when the icon 48 is selected by a leftward tilting operation of the commander unit 21, and the icon 48 is determined by a depressing operation of the commander unit 21, a message screen being a screen of a lower layer on the communication screen is displayed.

An operation unit image is displayed, in addition to the above-described selection items, on an information screen, a communication screen, a navigation screen, and a setting screen. Specifically, a plurality of selection items selectable by a turning operation of the commander unit 21 are displayed in alignment in an up-down direction on each layer of these operation screens, and a first operation unit image and a second operation unit image each mimicking the shape of the commander unit 21 are displayed.

A selected item among the plurality of selection items is displayed in a manner different from the other items by being enlarged or added with a line, for example. When the commander unit 21 is turned clockwise (in a forward direction), a selection target (a target for display in the different manner) successively shifts from an upper item to a lower item among the plurality of selection items. A second operation unit image is displayed on the outer side of a first operation image associated with a forward direction of the commander unit 21, specifically, displayed at a position away from the first operation unit image toward the right. Further, the second operation unit image is displayed at a position farther from the first operation unit image, as a layer of an operation screen becomes deeper.

On at least a part of a plurality of hierarchical screens included in the information screen, the communication screen, the navigation screen, and the setting screen, a plurality of selection items are separately displayed on a plurality of pages. In this case, a second operation unit image is displayed by being divided into a plurality of sections associated with the plurality of pages. Further, a section associated with a displayed page among the plurality of sections is displayed to be distinguished from the other section.

Lastly, a relationship between an operation of a switch other than the commander unit 21 on the operation unit 20, and display of the display 10 is described.

Display of the display 10 is configured to switch not only by an operation of the commander unit 21 (a turning operation, a tilting operation, and a depressing operation) but also by a depressing operation of the push buttons 22 to 26. Specifically, when the first push button 22 is depressed, the display 10 displays the home screen 40, when the second push button 23 is depressed, the display 10 displays a preceding screen, when the third push button 24 is depressed, the display 10 displays a navigation screen, when the fourth push button 25 is depressed, the display 10 displays a favorite screen that is set in advance, and when the fifth push button 26 is depressed, the display 10 displays the audio screen 50.

As described above, the vehicle display device 30 according to the present embodiment includes the display 10 for displaying an operation screen, the operation unit 20 prepared separately from the display 10, and the display control unit 36 for controlling display of the display 10 according to an operation of the operation unit 20. The operation unit 20 includes the turnable commander unit 21. The display control unit 36 displays, on an operation screen, an operation unit image (47, 57, 67) mimicking the shape of the commander unit 21, and a plurality of selection items selectable by a turning operation of the commander unit 21 in an overlapping manner.

According to this configuration, since a plurality of selection items, and the operation unit image (47, 57, 67) are displayed on the operation screen in an overlapping manner, as compared with a case that the operation unit image and the selection items are displayed at different positions, it is possible to display the operation unit image and the selection items respectively large on the operation screen of the display 10 having a limited area. This allows the driver to intuitively recognize selection items selectable by a turning operation of the commander unit 21, and guides the driver to operate the commander unit 21 (the operation unit 20) in a user-friendly manner Therefore, the driver can smoothly perform a desired operation with respect to a vehicle-mounted device, without frequently moving the line of sight to the operation unit 20. Specifically, the vehicle display device 30 according to the embodiment satisfies operability of the operation unit 20 and vehicle safety in a sophisticated manner.

In the embodiment, an arc-shaped image is displayed as the operation unit image (47, 57, 67), and the operation unit image is displayed in such a way as to turn in association with a turning operation of the commander unit 21. This allows the driver to intuitively recognize that a desired selection item can be selected by a turning operation of the commander unit 21.

In the embodiment, the plurality of selection items are displayed in alignment in an up-down direction, and a selection target successively shifts from an upper selection item to a lower selection item according to a turning operation of the commander unit 21 in a clockwise direction. Further, an arc-shaped operation unit image is displayed in such a way that a luminance of a right portion (47*a*, 57*a*, 67*a*) thereof is higher than a luminance of a left portion (47*b*, 57*b*, 67*b*) thereof. This allows the driver to intuitively recognize that a selection target shifts to a lower selection item by a turning operation of the commander unit 21 in a clockwise direction.

In the embodiment, the commander unit 21 is configured to be tiltable, and an icon (48, 58, 68) being a selection item selectable by a tilting operation of the commander unit 21 is displayed at a position associated with a direction of a tiling operation of the commander unit 21 within an outer area of the operation unit image (47, 57, 67). This allows the driver to intuitively recognize that there is a selection item selectable by a tilting operation of the commander unit 21.

In the embodiment, a first operation unit image (57, 67) and a second operation unit image (59, 69) each mimicking the shape of the commander unit 21 are displayed, and a plurality of selection items selectable by a turning operation of the commander unit 21 are displayed in alignment in an up-down direction on a screen of a part of an operation screen to be displayed in a hierarchical manner (e.g. the audio screen 50 of an upper layer and the CD/DVD screen 60). The second operation unit image (59, 69) is displayed at a position away from the first operation unit image (57, 67) toward the right, which is a direction associated with a forward direction (a clockwise direction) of the commander unit 21.

The above configuration allows the driver to intuitively recognize a forward direction of the commander unit 21, and enables to guide an operation of the commander unit 21 (the operation unit 20) in a user-friendly manner. Therefore, the driver can smoothly perform a desired operation with respect to a vehicle-mounted device, without frequently moving the line of sight to the operation unit 20.

In the embodiment, when a plurality of selection items are separately displayed on a plurality of pages (e.g. the first and second pages 60*a* and 60*b* of the CD/DVD screen 60), the second operation unit image (69) is divided into a plurality of sections (69*a* and 69*b*) associated with the plurality of pages, and a section associated with a displayed page of the plurality of pages is displayed to be distinguished from the other section. This allows the driver to recognize that there is a page other than the displayed page, without additionally displaying a page number. Specifically, it is possible to display many selection items by using a plurality of pages, while efficiently utilizing the operation screen by omitting a display space for a page number.

In the embodiment, the second operation unit image (59, 69) is displayed at a position farther from the first operation unit image (57, 67), as a layer of the operation screen becomes deeper. This makes it easy to recognize the layer of a displayed operation screen, based on a position of the second operation unit image (59, 69).

In the forgoing, a preferred embodiment according to the present invention has been described. The present invention, however, is not limited to the embodiment. Various improvements and design modifications are available, as far as the improvements and modifications do not depart from the gist of the present invention.

For example, in the embodiment, the operation unit 20 includes the cylindrical commander unit 21 (having a circular outer shape), and the display 10 displays an arc-shaped image, as the operation unit image (47, 57, 67). Alternatively, a commander unit having a polygonal outer shape such as an icosagonal shape may be employed as a commander unit, and the display 10 may display a polygonal image associated with the outer shape of the commander unit, as an operation unit image.

In the embodiment, when the first operation unit image (57, 67), the second operation unit image (59, 69), and a plurality of selection items are displayed on an operation screen of the display 10, the plurality of selection items are displayed at a position where the selection items overlap only the first operation unit image (57, 67). Alternatively, the plurality of selection items may be displayed at a position where the selection items overlap both of the first operation unit image and the second operation unit image.

In the embodiment, when the first operation unit image (57, 67) and the second operation unit image (59, 69) are displayed, a luminance of the right portion (57*a*, 67*a*) of the first operation unit image (57, 67) is set higher than a luminance of the left portion (57*b*, 67*b*) of the first operation unit image (57, 67). Alternatively, the luminance may be set equal to each other between the right portion and the left portion of the first operation unit image.

In the embodiment, the icon 48 indicating that a mail has been received is displayed on the left side of the operation unit image 47 on the home screen 40, as a selection item selectable by a leftward tilting operation of the commander unit 21. Alternatively, it is also possible to display the other selection items at a similar position.

In the embodiment, a selection item (e.g. the icon 48) selectable by a leftward tilting operation of the commander unit 21 is displayed on the left side of the operation unit image 47 on the home screen 40. Alternatively, the selection item may be displayed at a position associated with one of directions of tilting operations of the commander unit 21. For example, a selection item selectable by a rightward tilting operation of the commander unit 21 may be displayed on the right side of the operation unit image.

Figure 9:
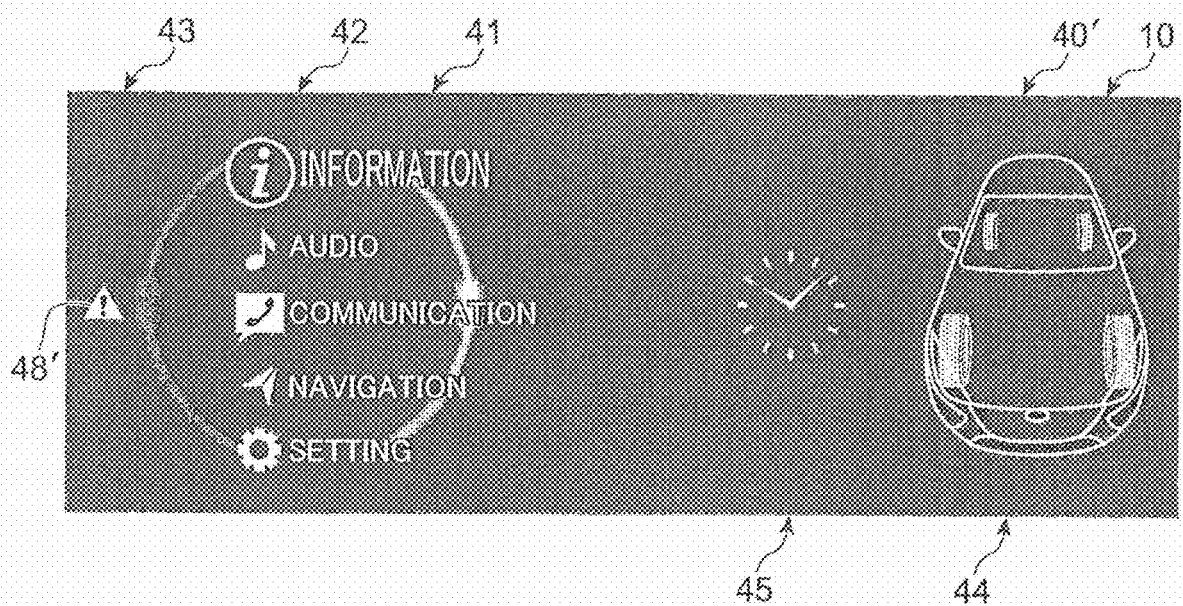
FIG. 9 is a diagram illustrating another home screen of the display.

In the embodiment, the home screen 40 illustrated in FIG. 4 is displayed on the display 10, as a home screen being an operation screen of an uppermost layer. It is possible, however, to display various types of screens other than the one illustrated in FIG. 4, as a home screen. FIG. 9 illustrates one example of another home screen 40' to be displayed on the display 10. In the example of FIG. 9, an icon 48' indicating that there is a matter to be warned as a selection item selectable by a leftward tilting operation of the commander unit 21 in a tilt selection item display portion 43 on the home screen 40'. In this case, an image indicating a content of a warning is displayed in a tilt selection content display portion 44. For example, when the content of the warning is an anomaly on a pneumatic pressure of a tire, as illustrated in FIG. 9, an image that evokes there is an anomaly in a tire is displayed.

Overview of Embodiment

The following is an overview of the embodiment.

A vehicle display device according to the embodiment includes a display for displaying an operation screen; an operation unit prepared separately from the display; and a display control unit for controlling display of the display according to an operation of the operation unit. The operation unit is configured to be turnable. The display control unit displays, on the operation screen, an operation unit image mimicking a shape of the operation unit, and a plurality of selection items selectable by a turning operation of the operation unit in an overlapping manner.

In the vehicle display device, since the plurality of selection items and the operation unit image are displayed on the operation screen in an overlapping manner, as compared with a case that the operation unit image and the selection items are displayed at different positions, it is possible to display each of the operation unit image and the selection items large on the operation screen of the display having a limited area. Thus, the above configuration allows a driver to intuitively recognize a selection item selectable by a turning operation of the operation unit, and enables to guide an operation of the operation unit in a user-friendly manner Therefore, the driver can smoothly perform a desired operation with respect to a vehicle-mounted device, without frequently moving the line of sight to the operation unit.

Preferably, the display control unit may display the operation unit image in such a way as to turn in association with a turning operation of the operation unit.

The above configuration allows the driver to intuitively recognize that a desired selection item can be selected by a turning operation of the operation unit. Thus, the above advantageous effect can be more effectively exhibited.

Preferably, the operation unit may include a commander unit configured to be turnable, and having a circular outer shape. The display control unit may display, as the operation unit image, an arc-shaped image mimicking the shape of the commander unit.

In the above configuration, by allowing the driver to recognize the arc-shaped operation unit image associated with the commander unit having a circular outer shape, a turning operation of the commander unit can be guided in a more user-friendly manner.

Preferably, the operation screen may include a plurality of screens having different layers. On the operation screen of at least a part of the layers, the display control unit may display a first operation unit image and a second operation unit image each mimicking the shape of the operation unit at positions away from each other, display the plurality of selection items in alignment in an up-down direction, and successively shift a selection target from an upper selection item to a lower selection item according to a turning operation of the operation unit in a forward direction. The second operation unit image may be displayed at a position away from the first operation unit image in a direction associated with the forward direction of the operation unit.

In the above configuration, since not only the first operation unit image, but also the second operation unit image, which is away from the first operation unit image in a direction associated with the forward direction of the operation unit are displayed on at least a part of a screen among the operation screens to be displayed in a hierarchical manner, it is possible to allow the driver to intuitively recognize the forward direction of the operation unit, and to guide an operation of the operation unit in a user-friendly manner Therefore, the driver can smoothly perform a desired operation with respect to a vehicle-mounted device, without frequently moving the line of sight to the operation unit 20.

For example, when the forward direction of the operation unit is a clockwise direction, the driver is allowed to intuitively recognize that the forward direction of the operation unit is a clockwise direction by displaying the second operation unit image on the right side of the first operation unit image.

In the above configuration, preferably, when the plurality of selection items are separately displayed on a plurality of pages, the display control unit may divide the second operation unit image into a plurality of sections associated with the plurality of pages, and display a section of the second operation unit image associated with a displayed page among the plurality of pages to be distinguished from the other section.

The above configuration allows the driver to recognize that there is a page other than the displayed page, without additionally displaying a page number. Specifically, it is possible to display many selection items by using a plurality of pages, while efficiently utilizing the operation screen by omitting a display space for a page number.

In the above configuration, preferably, the display control unit may display the second operation unit image at a position farther from the first operation unit image, as a layer of the operation screen becomes deeper.

The above configuration allows the driver to easily recognize a layer of the displayed operation screen, based on the position of the second operation unit image. Thus, the above advantageous effect can be more effectively exhibited.

In the above configuration, preferably, the display control unit may display the plurality of selection items in alignment in an up-down direction, successively shift a selection target from an upper selection item to a lower selection item according to a clockwise turning operation of the commander unit, and set a luminance of a right portion of the arc-shaped image higher than a luminance of a left portion of the arc-shaped image.

The above configuration allows the driver to intuitively recognize that a selection target shifts to a lower selection item by a clockwise turning operation of the commander unit.

Preferably, the operation unit may be configured to be tiltable. The display control unit may display a selection item selectable by a tilting operation of the operation unit at a position associated with a direction of a tiling operation of the operation unit within an outer area of the operation unit image.

The above configuration allows the driver to intuitively recognize that there is a selection item selectable by a tilting operation of the operation unit.

INDUSTRIAL APPLICABILITY

As described above, since a vehicle display device according to the present invention enables to intuitively guide an operation of an operation unit with use of an operation screen of a display in a user-friendly manner, the vehicle display device is advantageously usable in an industrial field of manufacturing vehicles such as automobiles.

The invention claimed is:
1. A vehicle display device comprising:
a display for displaying an operation screen;
an operation unit prepared separately from the display; and
a display control unit for controlling display of the display according to an operation of the operation unit, wherein
the operation unit is configured to be turnable,
the display control unit displays, on the operation screen,
an operation unit image mimicking a shape of the operation unit, and a plurality of selection items selectable by a turning operation of the operation unit in an overlapping manner, the operation unit includes a commander unit configured to be turnable, and having a circular outer shape, the display control unit displays, as the operation unit image, an arc-shaped image including a right semi-arcuate portion having a rightward projecting semi-arcuate shape, a left semi-arcuate portion disposed on a left side of the right semi-arcuate portion and having a leftward projecting semi-arcuate shape, a right broad portion formed by partially widening the right semi-arcuate portion, and a left broad portion formed by partially widening the left semi-arcuate portion, the display control unit displays the plurality of selection items in alignment in an up-down direction, and successively shifts a selection target from an upper selection item to a lower selection item according to a clockwise turning operation of the commander unit, and the display control unit sets a luminance of the right semi-arcuate portion and the right broad portion higher than a luminance of the left semi-arcuate portion and the left broad portion, and moves the right and left broad portions clockwise along the right and left semi-arcuate portions according to the clockwise turning operation of the commander unit.

2. The vehicle display device according to claim 1, wherein
the operation screen includes a plurality of screens having different layers,
on the operation screen of at least a part of layers, the display control unit displays a first operation unit image including the right and left semi-arcuate portions and the right and left broad portions, and a second operation unit image having a rightward projecting semi-arcuate shape and located away from the right semi-arcuate portion of the first operation unit image to the right.

3. The vehicle display device according to claim 2, wherein
when the plurality of selection items are separately displayed on a plurality of pages, the display control unit divides the second operation unit image into a plurality of sections associated with the plurality of pages, and sets a luminance of a section of the second operation unit image associated with a displayed page among the plurality of pages higher than a luminance of the other section.

4. The vehicle display device according to claim 3, wherein
the display control unit displays the second operation unit image at a position farther from the right semi-arcuate portion of the first operation unit image, as a layer of the operation screen becomes deeper.

5. The vehicle display device according to claim 2, wherein
the display control unit displays the second operation unit image at a position farther from the right semi-arcuate portion of the first operation unit image, as a layer of the operation screen becomes deeper.

6. The vehicle display device according to claim 1, wherein
the operation unit is configured to be tiltable, and
the display control unit displays a selection item selectable by a tilting operation of the operation unit at a position associated with a direction of a tiling operation of the operation unit within an outer area of the operation unit image.

* * * * *